Sept. 25, 1962     M. B. MacINNIS ETAL     3,055,741
METHOD FOR PRODUCING SILICON
Filed Dec. 22, 1960
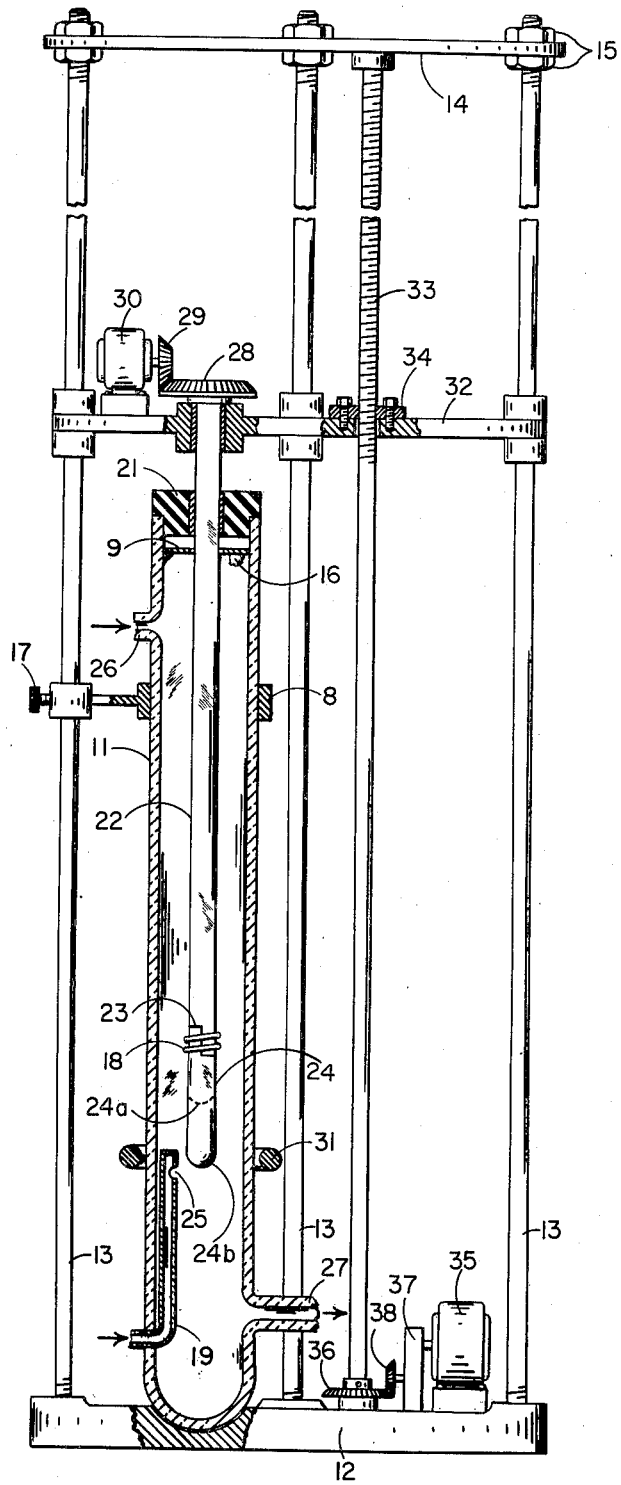
INVENTORS.
MARTIN B. MacINNIS
and ALEXANDER S. TULK
BY *Elmer J. Nealon*
ATTORNEY.

United States Patent Office 3,055,741
Patented Sept. 25, 1962

3,055,741
METHOD FOR PRODUCING SILICON
Martin Benedict MacInnis and Alexander Stuart Tulk, Towanda, Pa., assignors to Sylvania Electric Products Inc., a corporation of Delaware
Filed Dec. 22, 1960, Ser. No. 77,716
6 Claims. (Cl. 23—223.5)

This invention relates to a method for producing silicon of controlled purity, and more particularly to a method for producing bodies of such silicon of single crystal structure, directly from a compound of silicon in the vapor state.

It has been a common procedure in the production of silicon for use in the manufacture of semiconductor devices first to prepare silicon in polycrystalline form by the reduction of silicon from its compounds as, for example, by the reduction of silicon tetrachloride by means of zinc or hydrogen. The polycrystalline silicon so produced then is melted in a quartz vessel and a single crystal seed of silicon is brought into contact with the molten mass. The molten silicon solidifies on the seed as a continuation of the single crystal structure and an elongated single crystal ingot is formed by withdrawal of the seed and adherent solidified silicon as the solidification and crystallization process proceeds. Two significant objections to this method are well recognized. Firstly, at the high temperatures necessary to maintain the silicon in molten condition, impurities from the quartz vessel contaminate the melt and single crystal pulled therefrom. In fact, it has been demonstrated that silicon crystals pulled from a melt contained in a quartz vessel may contain up to $10^{18}$ oxygen atoms per cubic centimeter. Secondly, in a crystal grown by this technique the concentration of any impurities present in the silicon varies substantially from one end to the other end of the crystal. For example, with respect to an impurity which has a segregation coefficient less than unity, the melt becomes richer in the impurity as a crystal is pulled from it. As a result, the impurity content, and therefore the electrical characteristics, of the crystal also vary throughout its length, making it impossible to evaluate the crystal for purposes of producing large numbers of semiconductor devices of identical electrical characteristics.

Recently single crystal silicon has been produced by deposition from the vapor phase as an extremely thin layer on a single-crystal substrate. In this process the substrate necessarily becomes part of the ultimate product and must be subdivided and consumed in the production of small pieces for semiconductor device application. This necessitates the additional operation of preparing substrate material.

It is, therefore, an object of the invention to provide a method for producing bodies of silicon which permits accurate control of the kind and content of impurities in the bodies.

Another object of the invention is to provide a method for producing silicon bodies free of substrate portions.

A further object of the invention is to provide a method for producing silicon bodies in single crystal form which are of uniform electrical characteristics throughout.

In the method of the present invention, a gaseous reaction mixture comprising hydrogen and a halogenated silane is passed in contact with a heated portion of a seed body of silicon supported in a reaction chamber, the portion of the body and its associated surface being heated at least to the melting point of silicon. Under these conditions, elemental silicon produced from the reaction mixture deposits on the heated surface in molten form. Desirably the seed body is elongated and is of either round or square cross section. Heating is concentrated at the one portion, preferably an extremity of the body, which it is desired to melt. As a feature of the invention an atmosphere of a gas which will not react with the silicon at lower temperatures, preferably hydrogen, is maintained in contact with all the surfaces of the seed body which are not heated at least to its melting point, thereby preventing deposition of additional silicon from the gaseous reaction mixture on any surface of the body which is at a temperature below its melting point. As silicon is deposited on the surface of the molten portion of the body, the temperature of the body in the region of the solid and molten portions is reduced to cause progressive solidification of the molten portion. To accomplish this, relative movement is maintained between the body of silicon and the means for locally heating the body so that the body is withdrawn from the heating zone, and solidification occurs, at the rate at which molten silicon is deposited on the molten portion.

The method will be described hereinafter in detail with reference to the accompanying drawing which is a side elevation, partly in section, of an apparatus for preparing silicon bodies in accordance with the present method.

As shown in the drawing, the apparatus includes a generally tubular reaction vessel 11 fabricated from a material preferably quartz, which is resistant to attack by the reaction gases. The vessel rests in a recess in a rectangular base plate 12. Four vertical supporting rods 13, three of which are shown, are threaded into the base plate, and are maintained in parallel relationship by means of the rectangular plate 14 constituting the upper frame member of the apparatus, the upper ends of the rods being secured in holes adjacent the corners of the plate 14 by means of clamping nuts 15. The reaction vessel is supported vertically by means of a clamping ring 8 encircling the vessel and secured by a set screw 17 to one of the vertical supporting rods.

The reaction vessel 11 is closed at its lower end. The upper end of the reaction vessel is closed during operation of the apparatus by means of a plug 21 formed from a resilient material such as a synthetic rubber. The plug is provided with an axially extending aperture through which extends a vertically movable rod 22 for supporting the seed body 24 of silicon and the additional silicon deposited on the seed during the operation. An annular metal ring 9 is supported just below the plug on projections 16 extending from the inner surface of the reaction vessel. This ring serves to protect the plug from the heat radiated from the hot silicon located lower down in the reaction vessel. The rod 22 is preferably of quartz and is provided with an eccentric notch 23 at its lower end for engagement with a mating notch in the end of the seed crystal 24.

A tube 19 for conducting the reaction gases into the reaction zone extends through the wall of the reaction vessel and is provided with an opening 25 at its inner end. The reaction vessel also has near its upper end an inlet 26 for a gas which is non-reactive with the silicon body within the vessel and an outlet 27 near its lower end for the excess reaction gases and by-product gases resulting from the decomposition of the silicon-containing reaction gases.

To supply heat to the silicon body within the vessel an RF heating coil 31 is mounted around the outside of the reaction vessel at substantially the same level as the opening 25 in the reaction-gas inlet tube 24.

In order to insure uniform growth of the silicon on the seed crystal, the rod 22 and the body of silicon attached to its lower end are rotated continuously during the operation. To accomplish this rotation, the upper end of the rod 22 is secured in the hub of gear 28 which is driven by an electric motor 30 through gear 29. Gear 28 and motor 30 are supported on a horizontal platform 32 which is vertically movable along supporting rods 13.

Vertical movement of platform 32, and therefore the rod 22 and the seed body 24, is obtained by rotation of the vertical shaft 33 which is rotatably secured at its extremities in the base plate 12 and the upper plate 14. The upper portion of the shaft is threaded, as shown, to engage mating threads in the collar 34 bolted to the upper surface of the platform 32. Rotation of the shaft in either direction is obtained by means of an electric motor 35. Gear 36 keyed to the shaft 33 is driven by motor 35 through the reducing gear train 37 and the small gear 38.

In carrying out the method of the invention employing the apparatus described above, the platform 32 first is elevated to its uppermost position so that the lower end of the rod is completely withdrawn from the reaction vessel 11. During this operation the plug 21 is removed from the top of the reaction vessel and is slid upwardly along the supporting rod 22. A small seed body of single crystal silicon which has previously been eccentrically notched at its upper end to match the notch 23 in the lower end of the rod 22 is secured to the lower end of the rod as, for example, by tightly coiling one or more turns of a heat resistant wire 18 about the overlapping portions of the seed and rod as shown. For reasons given below, it is desirable to use a wire of electrically conductive material such as, for example, molybdenum, for this purpose. The seed body may be of any desired cross-sectional shape, although bodies of circular or square section are preferred.

The rod, with the seed body secured to its lower end, is lowered into the reaction vessel by appropriate operation of the motor 35, and the plug 21 is replaced in position as shown in the drawing. With the rod lowered sufficiently to locate the wire coil 18 at the level of the RF coil 31, the apparatus is flushed out with an inert gas such as argon which is admitted through the gas inlets 19 and 26 and exhausted from outlet connection 27. After the system has been purged of contaminating gases the RF coil 31 is turned on and the coil 18, by virtue of the fact that it is of electrically conductive material, is rapidly heated, transferring the heat to the silicon seed until the silicon reaches a temperature of about 800° C. At temperatures of this order the resistivity of the silicon decreases sufficiently to cause the seed body to couple to the RF field of the coil 31. At this point the supporting rod is raised by operation of the motor 35 until the extreme lower end of the seed is in the field of the RF coil and is heated sufficiently to develop a molten surface represented in the drawing by the broken line 24a.

When a molten surface has formed on the lower end of the seed, the flow of flushing gas into the reaction vessel is stopped, and hydrogen or other gas, such as argon or helium, which is non-reactive with the molten silicon is admitted through the inlet 26 and a gaseous mixture of hydrogen and a halogenated silane is supplied through the inlet tube 19. As the gaseous reaction mixture comes into contact with the molten end surface of the seed body, silicon produced by decomposition of the halogenated silane at the high temperature of the surface deposits as additional molten silicon on the seed body. Unreacted halogenated silane, excess hydrogen and hydrogen chloride resulting from the reaction between the halogenated silane and the hydrogen are drawn continuously from the gas outlet 27 at the lower end of the reaction vessel.

During the deposition of silicon on the seed body the motor 35 is operated to rotate threaded shaft 33 in a direction to elevate platform 32, the rod 22 and the crystal attached to the lower end of the rod. As the crystal is raised the motlen silicon at its lower end is withdrawn upward from the heating zone of the RF coil 31 and solidifies at the interface between the molten and solid portions. Thus as shown in the drawing the material of the body between the lines 24a and 24b were deposited during the operation of the process. It has been found that where the initial body is of single crystal structure the silicon solidifies in single crystal form as a continuation of the initial structure. The speed of the motor 35 is adjusted by observation of the operation through the transparent walls of the reaction vessel so that the cross-section of the crystal remains constant throughout the operation. That is, the crystal is withdrawn from the reaction zone, and deposited silicon is solidified, at the same rate as silicon is deposited on the molten extremity of the crystal. The operation may be continued in this manner until the uppermost portion of the seed body reaches the metal ring under the closure plug of the reaction vessel. The seed body together with the additional length of deposited silicon can then be removed from the vessel for use in various applications such as, for example, in the production of semiconductor diodes and transistors.

An important feature of the present process is the manner in which deposition of silicon on the solid portion of the seed body and on the solidified portion of the silicon deposited during the process is prevented. As is well known from the so-called "epitaxial growth" method of depositing silicon from the vapor state onto a solid silicon substrate, silicon will deposit on the substrate at temperatures below the melting point of silicon, and of the order of those found in the solid silicon within the reaction vessel used in the present process. Although this is not objectionable in the epitaxial procedure, and the thin films deposited form a continuation of the crystal structure of the substrate, such deposition on the un-molten portions of the silicon body cannot be tolerated in the present method, in which deposition of silicon in substantial bulk is desired, for the reason that the resulting random deposition tends to result in solidification of the silicon in polycrystalline form. It has been found that such deposition of silicon on the surfaces of the silicon body which are at temperatures below the melting point is avoided by controlling the relative rates of flow of the reaction gases supplied through the inlet tube 19 and the gas which is non-reactive with the heated silicon admitted through the inlet 26. More particularly, sufficient non-reactive gas is admitted through the inlet 26 to maintain a non-reactive atmosphere around the entire upper portion of the silicon body so that the halogenated silane in the mixture of gases flowing from the opening 25 can contact only the molten portion of the body lying within the heating influence of the RF coil 31. Since it is necessary to provide a substantial excess of hydrogen in the reaction or decomposition zone, it is expedient to use hydrogen as the non-reactive gas supplied through the inlet 26. If other non-reactive gases such as helium or argon are employed to screen the non-molten portions of the silicon from the reaction gases, the entire amount of hydrogen for the reaction must be supplied in admixture with the halogenated silane through the inlet tube 19.

In a typical operation illustrative of the method of the invention, and employing the apparatus shown in the drawing, the initial seed body was a single crystal of silicon about 30 mm. in length and 12 mm. in diameter. The reaction vessel 11 was about 26 cm. in length and had an inside diameter of about 22 mm. The temperature of the extreme lower end of the silicon body was maintained in molten condition at a temperature of about 1420° C. by means of RF power supplied to the heating coil 31 at a frequency of 3.5 megacycles. During the operation pure hydrogen gas was supplied to the reaction vessel through the inlet 26 at the rate of about 8 cubic feet per hour (measured at standard temperature and pressure), and additional hydrogen was supplied through the reaction gas inlet tube 19 at the rate of about 2 cubic feet per hour. Silicon tetrachloride vapor was also supplied through tube 19 along with the hydrogen. The rate of feed of the silicon tetrachloride was such that the silicon tetrachloride was about 4.3 mole percent of the total hydrogen fed to the reaction vessel. Under these conditions silicon was deposited on the silicon body within the vessel at the average rate of about 150 grams per square decimeter of end surface of the silicon body per hour. The molten silicon solidified as a continuation of the single crystal structure of the seed body and the lateral surfaces of the silicon body formed were an extension of the corresponding surfaces of the seed body.

What is claimed is:

1. The method of producing elemental silicon which comprises heating a portion of a body of silicon at least to the melting point of silicon, passing a vapor of a halogenated silane in contact with a surface of said portion to cause deposition of silicon on said surface and concurrently maintaining a non-reactive gaseous atmosphere in contact with the surfaces of said body of silicon which are below the melting point of silicon to prevent contact of said vapor with said surfaces.

2. The method of producing elemental silicon which comprises heating an extremity of a body of silicon at least to the melting point thereof, passing a vapor mixture comprising a halogenated silane in contact with said extremity to cause deposition of elemental silicon thereon and concurrently passing hydrogen over the surfaces of said body which are not above the melting point of the body to prevent contact of said halogenated silane vapor with said surfaces.

3. The method of growing silicon in single crystal form on a single-crystal body of silicon which comprises supporting said body within a reaction chamber, heating a portion of the body at an extremity thereof at least to the melting point of silicon, passing a vapor including a halogenated silane in contact with the surface of the molten portion to cause decomposition of said silane and deposition of elemental silicon on the surface of said portion, simultaneously passing an inert gas over the surfaces of the solid portion of said body to prevent contact of the vapor of the silicon compound with said surfaces and permitting the molten silicon to solidify progressively at the interface between said molten portion and said solid portion at the rate at which elemental silicon is deposited on the surface of said molten zone so that the quantity of silicon in said molten zone remains substantially constant.

4. The method of growing silicon in single-crystal form which comprises supporting a single-crystal seed of silicon within a reaction chamber, heating an end portion of the seed at least to the melting point of silicon, passing a gaseous reaction mixture containing a halogenated silane and hydrogen in contact with the molten surface of said end portion to cause deposition of molten silicon from said reaction mixture on the molten surface, simultaneously maintaining an atmosphere of hydrogen in contact with the surfaces of the portion of said seed which is not heated above the melting point thereof to prevent contact of said gaseous reaction mixture with said surfaces, and progressively cooling to solidify the molten portion at the interface between the molten portion and the solid portion at substantially the rate at which silicon is deposited on said molten surface.

5. The method of producing silicon in single-crystal form which comprises movably supporting a body of single crystal silicon in a reaction chamber with an end portion of the body within a heating zone in said chamber to raise the temperature of said end portion at least to the melting point of silicon and produce a molten surface thereon, passing a gaseous mixture comprising a halogenated silane and hydrogen in contact with said molten surface to cause reaction of the halogenated silane and hydrogen and deposition of molten silicon on said molten surface, simultaneously maintaining an atmosphere of hydrogen in contact with the surfaces of said body other than the molten surface to prevent contact of the halogenated silane therewith and continuously moving said body so as to remove the molten portion thereof from said zone substantially at the rate of accumulation of molten silicon on the molten surface.

6. The method of producing silicon in single-crystal form which comprises movably supporting a body of single-crystal silicon in a reaction chamber having a heating zone extending transversely of the path of movement of said body, heating an end portion of the body in said zone to at least the melting point of silicon, continuously passing a gaseous reaction mixture comprising silicon tetrachloride and hydrogen over the molten surface of the end portion to cause reaction between the halogenated silane and hydrogen and deposition of molten silicon on the molten surface, maintaining an atmosphere of hydrogen in contact with the surfaces of said body other than said molten surfaces to prevent deposition of silicon on said surfaces continuously moving said body away from said heating zone to permit cooling of the molten silicon and solidification thereof at the liquid-solid interface between the molten end portion of the body within said zone and the remaining solid portion of the body, movement of the body being at substantially the rate at which silicon is deposited on molten end portion.

References Cited in the file of this patent

UNITED STATES PATENTS

| 2,768,074 | Stauffer | Oct. 23, 1956 |
| 2,925,357 | Kothen | Feb. 16, 1960 |
| 2,938,772 | Enk et al. | May 31, 1960 |

FOREIGN PATENTS

| 745,698 | Great Britain | Feb. 29, 1956 |